US011770605B2

(12) United States Patent
Laine et al.

(10) Patent No.: US 11,770,605 B2
(45) Date of Patent: *Sep. 26, 2023

(54) APPARATUS AND METHOD FOR REMOTE IMAGE CAPTURE WITH AUTOMATIC SUBJECT SELECTION

(71) Applicant: Super Selfie, Inc., Reno, NV (US)

(72) Inventors: Paul Laine, Reno, NV (US); Greg Shirakyan, Reno, NV (US)

(73) Assignee: Super Selfie, Inc, Reno, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/867,225

(22) Filed: Jul. 18, 2022

(65) Prior Publication Data

US 2022/0353410 A1 Nov. 3, 2022

Related U.S. Application Data

(63) Continuation of application No. 17/062,304, filed on Oct. 2, 2020, now Pat. No. 11,418,708.

(60) Provisional application No. 62/910,045, filed on Oct. 3, 2019.

(51) Int. Cl.
*H04N 23/60* (2023.01)
*H04N 7/18* (2006.01)
*H04N 23/611* (2023.01)

(52) U.S. Cl.
CPC ............. *H04N 23/64* (2023.01); *H04N 7/18* (2013.01); *H04N 23/611* (2023.01)

(58) Field of Classification Search
CPC ........ H04N 23/64; H04N 7/18; H04N 23/611; H04N 23/632; H04N 23/661; H04N 7/185
See application file for complete search history.

(56) References Cited

U.S. PATENT DOCUMENTS

| 6,295,502 | B1 | 9/2001 | Hancock et al. | |
|---|---|---|---|---|
| 9,147,047 | B1 | 9/2015 | Grun et al. | |
| 11,418,708 | B2 | 8/2022 | Laine et al. | |
| 2012/0127319 | A1 | 5/2012 | Rao et al. | |
| 2012/0236173 | A1* | 9/2012 | Telek | H04N 23/62 348/E9.051 |
| 2012/0307091 | A1 | 12/2012 | Yumiki et al. | |
| 2013/0210563 | A1 | 8/2013 | Hollinger | |
| 2013/0247117 | A1* | 9/2013 | Yamada | H04W 4/029 340/12.5 |
| 2015/0229889 | A1 | 8/2015 | Boettiger | |

(Continued)

OTHER PUBLICATIONS

International Search Report and Written Opinion for PCT/US2020/054051, dated Jan. 5, 2021, 8 pages.

*Primary Examiner* — Gevell V Selby
(74) *Attorney, Agent, or Firm* — Cooley LLP

(57) ABSTRACT

A method includes operating a remote image capture system within a defined geolocation region. The remote image capture system includes a camera, position orientation controls for the camera, ambient sensors and a control unit. A user of a client device that enters the geolocation region is designated based upon identifying information received from the client device and user facial recognition data. Attributes of the geolocation region are communicated to the client device. An image capture location within the geolocation region is communicated to the client device. The client device is provided a prompt to activate the camera.

19 Claims, 6 Drawing Sheets

(56) References Cited

U.S. PATENT DOCUMENTS

2018/0131875 A1   5/2018 Young
2021/0368136 A1* 11/2021 Chalmers ............ H04L 12/1813

* cited by examiner

APPARATUS AND METHOD FOR REMOTE IMAGE CAPTURE WITH AUTOMATIC SUBJECT SELECTION

CROSS-REFERENCE TO RELATED APPLICATION

This application is a continuation of U.S. application Ser. No. 17/062,304, filed Oct. 2, 2020, which claims priority to U.S. Provisional Patent Application Ser. No. 62/910,045, filed Oct. 3, 2019, the contents of which are incorporated herein by reference.

FIELD OF THE INVENTION

This invention relates generally to image capture systems. More particularly, this invention relates to techniques for remote image capture with automatic subject selection.

BACKGROUND OF THE INVENTION

Traditional remote image capture systems suffer a number of usability challenges. First, there is no automatic aiming of the remote camera onto users. The cameras are either fixed, positioned to aim at a specific spot or require explicit user action, such as specifying a seat on a stadium to direct a motorized remote capture camera to aim at a particular spot. Second, the awareness of the fact that there is in fact a remote capture opportunity and discovering the exact locations of cameras is challenging, and requires a human attendant or physical markers in the environment, thus increasing the cost or reducing the feasibility of implementing a remote capture systems in certain environments. Third, it is a challenge to supply instructions and operate some kind of a device, such as a barcode scanner installed at a capture site, to initiate the picture-taking process.

Thus, there is a need for improved remote image capture systems.

SUMMARY OF THE INVENTION

A method includes operating a remote image capture system within a defined geolocation region. The remote image capture system includes a camera, position orientation controls for the camera, ambient sensors and a control unit. A user of a client device that enters the geolocation region is designated based upon identifying information received from the client device and user facial recognition data. Attributes of the geolocation region are communicated to the client device. An image capture location within the geolocation region is communicated to the client device. The client device is provided a prompt to activate the camera.

BRIEF DESCRIPTION OF THE FIGURES

The invention is more fully appreciated in connection with the following detailed description taken in conjunction with the accompanying drawings, in which.

Like reference numerals refer to corresponding parts throughout the several views of the drawings.

DETAILED DESCRIPTION OF THE INVENTION

Figure 1:
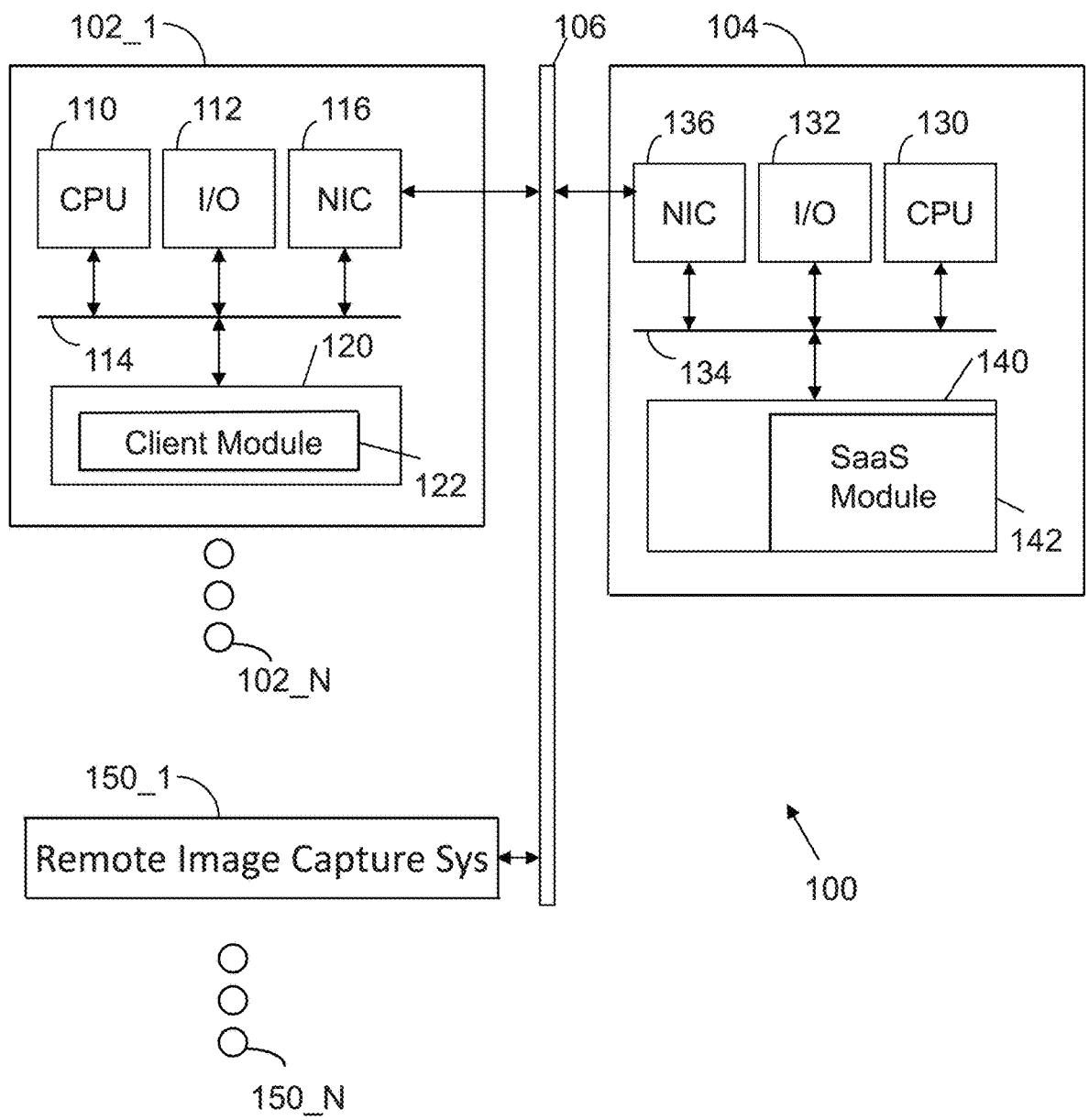
FIG. 1 illustrates a system configured in accordance with an embodiment of the invention.

FIG. 1 illustrates a system 100 configured in accordance with an embodiment of the invention. The system 100 includes a set of client devices 102_1 through 102_N in communication with a server 104 via a network 106, which may be any combination of wired and wireless networks. Also connected to the network 106 is a set of remote image capture systems 150_1 through 150_N.

Client device 102_1 includes a processor (e.g., central processing unit) 110 connected to input/output devices 112 via a bus 114. The input/output devices 112 may include a keyboard, touch display and the like. A network interface circuit 116 is also connected to the bus 114 to provide connectivity to network 106. A memory 120 is also connected to the bus 114. The memory 120 stores a client module 122 with instructions executed by processor 110 to implement client side operations disclosed herein. The client device 102_1 is typically a mobile device, such as a smartphone.

Server 104 includes a processor 130, input/output devices 132, a bus 134 and a network interface circuit 136. A memory 140 is connected to bus 134. The memory 140 stores a Software as a Service (SaaS) module 142 with instructions executed by processor 130 to implement operations disclosed herein. The SaaS module 142 communicates with client devices 102_1 through 102_N and remote image capture systems 150_1 through 150_N to coordinate image capture of a user of a client device 102_1 when the user is within a capture area of one or more remote image capture systems 150_1 through 150_N.

The system 100 operates as a photography service in commercial and public settings, such as venues, attractions, cities, etc. The system 100 generates valuable visual memories and experiences for people visiting those venues, promotes brands and destinations, and provides end users with a new photographic or video option, which they can control with the same ease as their own mobile device camera, but which is installed elsewhere in the physical environment. Each remote image capture system 150_1 through 150_N uses sensor data to analyze the environment in real time, find human subjects, and works in tandem with the client module 122 on the end users' mobile devices 102_1 through 102_N to notify the end users proactively of a capture opportunity, provide the best capture experience, creative filtering options, ensure privacy and allow authorized access to the resulting media. The functions of the remote image capture systems 150_1 through 150_N are controlled by software running on a control unit associated with each rig 150_1 through 150_N, which communicates with the SaaS module 142 and the client module 122 of client devices 102_1 through 102_N. As such, it is a significant improvement over existing solutions (traditional remote capture systems) that require explicit human action (e.g., scanning a barcode or entering a seat number in a stadium) to accomplish the same goal.

Figure 2:
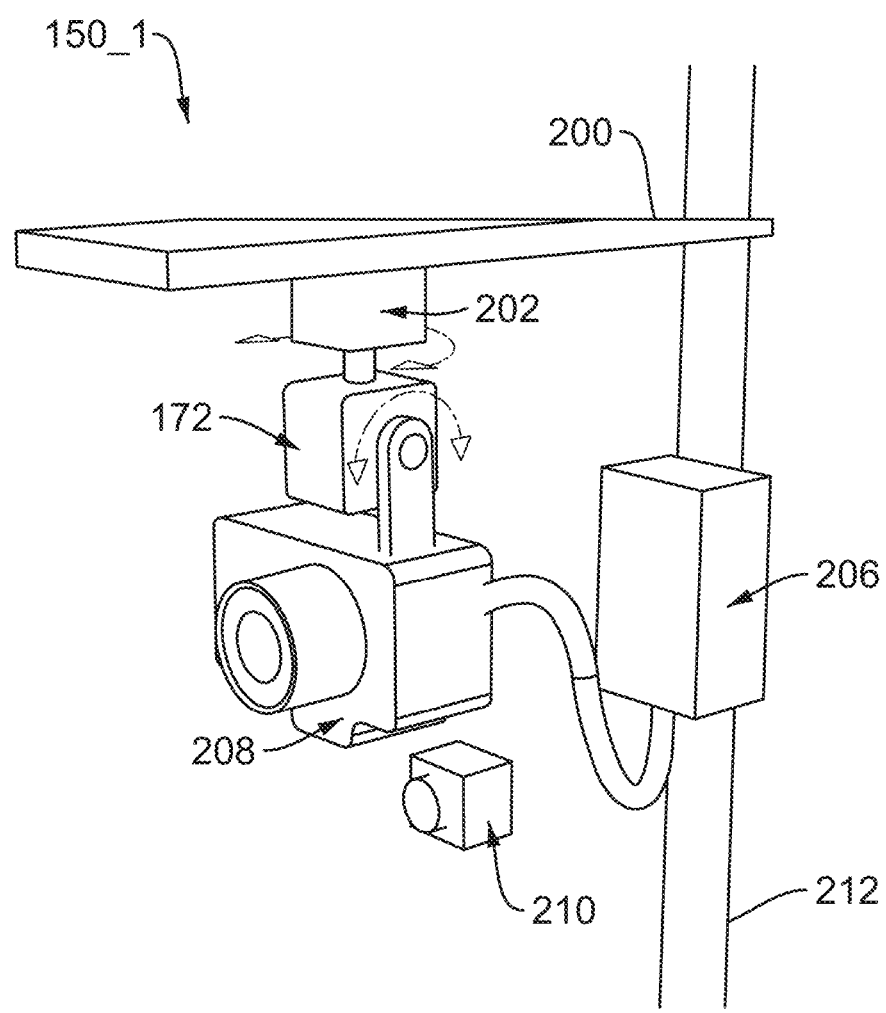
FIG. 2 illustrates a remote image capture system configured in accordance with an embodiment of the invention.

FIG. 2 illustrates remote image capture system 150_1. A housing and a mounting fixture 200 holds all components and provides necessary attachment points to mount a remote capture system on various kinds of support fixtures already present in the environment, or installed specifically for the purpose of attaching a remote image capture system to, as well as to protect the remote capture system from environmental elements such as dust, precipitation, animals, excessive heat or cold from interfering with the normal operation of the remote capture system.

A pan actuator 202 provides motorized positioning of the camera 208 along the horizontal (pan) axis. A tilt actuator 204 provides motorized positioning of the camera 208 along the vertical (tilt) axis. Control unit 206, typically comprising a compute device, such as a small form-factor PC and electronics, such as power supplies, microcontrollers, networking hubs necessary to provide electrical power and signals to actuate the camera 208, as well as to make the capture system remotely controllable from the Internet and to transmit the images and visual signals from the camera 208 to the SaaS module 142 or client module 122. At least one digital camera 208, such as a DSLR, Point and Shoot or a web-camera capable of capturing still and video images is mounted on the remote image capture system 150_1.

Zero or more additional sensors 210, such as light, depth, sound, gravity, temperature, magnetic field, gyroscope, positioning (i.e. GPS), and others, aid the remote capture system operation by supplying additional information about the environment in which the remote capture system is operating, as well as information about the human subjects in that environment.

A support fixture 212 securely attaches the remote capture system housing to a fixture, such as a light pole, structural bulkhead, wall, ceiling or tree.

Photographic camera 208 is any electronic or electromechanical device capable of producing a visual image on a digital, film or other media. This includes dedicated digital cameras, such as digital SLRs, compact point and shoot cameras, web cameras, tablet and phone cameras, dedicated RGB sensors, etc.

Modern photographic cameras are capable or recording video clips with sound. A remote capture system capable of recording a video in addition to or instead of still photographs may be used in accordance with an embodiment of this invention.

The control unit 206 is any computer or microcontroller-based computation device with digital input ports, such as USB or GPIO to receive sensor signals, a processor unit for processing sensor data, and digital outputs for controlling lower level electronic components, such as motors and other actuators, light sources, sound sources and digital displays, such as computer or TV screens. The control unit 206 performs those functions using software programs designed to operate a remote capture system. More particularly, the control unit 206 includes the software and the algorithms that process sensor information, make decisions in real time (such as where to move the motorized platform, when to trigger the picture, how to process the resulting image, etc.) and direct the lower-level hardware (such as controllers, motors and lights). The control unit 206 can be configured to:

re-position the photographic camera.
trigger a photographic or video camera to capture an image or start recording a video.
zoom the lens of a photographic camera.
turn on or off lights or other electronic devices needed to attract end user's attention towards a remote capture system.
determine creative effects (e.g., artistic filters) to be applied to the digital images.
alter the behavior of the remote capture system in response to gestures, poses, actions, sounds, facial expressions and other information associated with humans detected by the camera.

Once people on the scene have been detected, the control unit 206, using its onboard camera 208, may analyze additional factors within the scene that can be used to decide the operation of the remote capture system, such that it results in higher quality content capture. Such factors may include:

People looking (or not) at or in direction of the remote capture system.
People facing (or not) the remote capture system (subject's body is turned towards the photobooth).
People waving hands, or pointing at the remote capture system.
People striking poses typically observed when humans know they are being photographed.
People assembling in tight groups, facing the remote capture system.

The foregoing analyses of the scene may also be performed by the SaaS module 142, which operates in conjunction with the control unit 206.

Figure 3:
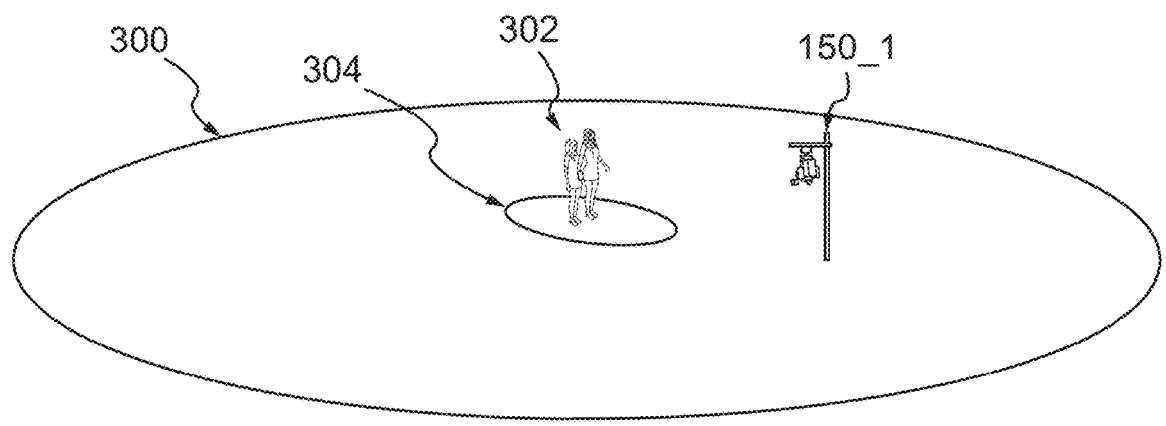
FIG. 3 illustrates a remote image capture system and corresponding notification area.

FIG. 3 illustrates a remote image capture system 150_1 and an associated user notification area 300. The user notification area 300 may be a pre-defined geolocation associated with the remote image capture system 150_1. WiFi beacons attached to the remote image capture system 150_1 send coded WiFi signals throughout the geolocation. When the client device 102_1 enters the user notification area 300, the client module 122 senses the WiFi beacon and sends user identification information and a time stamp to the remote image capture system 150_1, which is processed by the control unit 206 and/or the SaaS module 142. Alternately, the identification information and the time stamp may be directly sent to the SaaS module 142 through a separate communication channel. The control unit 206 and/or the SaaS module 142 pass to the client module 122 information regarding the geolocation, and more particularly, information about image capture options that are available at the geolocation.

An embodiment of the invention utilizes facial recognition when a user enters the notification area 300. The user's face is registered with the system when the user activates the client module 122. Front facing cameras on client device 102_1 can be used to capture facial information. Alternately, a user may submit a facial image from a camera roll on the client device 102_1. The remote capture system 150_1 and/or SaaS module 142 can monitor the notification area 300 and identify faces in its camera view. Thus, the remote image capture system 150_1 and SaaS module 142 may receive identifying information from the client module 122 along with facial recognition information to authoritatively identify an individual.

When a known registered user is detected, a notification is sent to that user, such as a text message with a link to open a remote capture application or a website. Further, the client module 122 may receive instructions to direct the user 302 to a capture area 304 with an optimal position for image capture.

As users approach and enter the notification area 300, the remote image capture system 150_1 may start live-streaming the view of the scene with users in it, and let users trigger the camera 208 to capture photos and/or videos. Thus, unlike traditional remote capture solutions, an embodiment of the invention automatically determines a user's position in the scene, proactively notifies the user of a capture opportunity, and thus automates the process of discovery and guidance towards the capture area 304.

Figure 4:
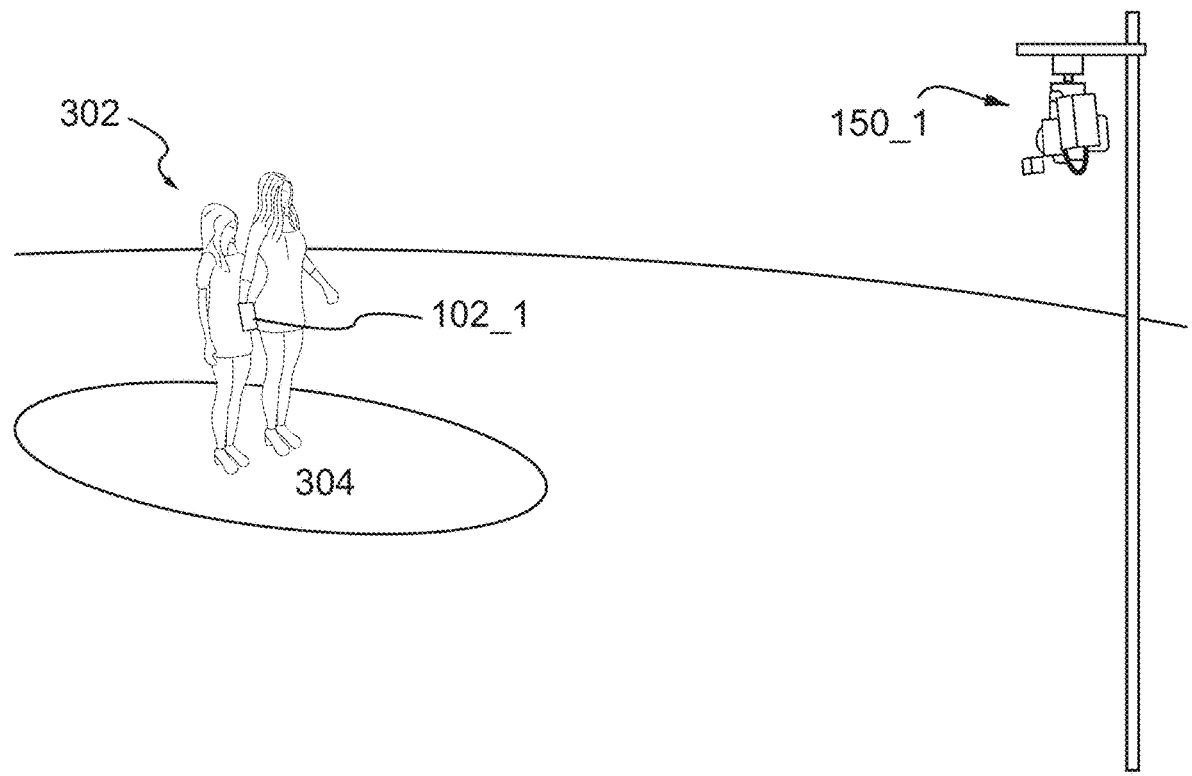
FIG. 4 illustrates users inside a capture area associated with a remote image capture system.

FIG. 4 is an enlarged view of users 302, one of which is holding a client device 102_1 in a capture area 304. In one embodiment, the client module 122 allows the user to adjust and refine the scene capture angle by providing the user with a live view from the remote capture system 150_1. The client module 122 allows the user to tap on the live view for the purpose of centering the capture system around that point.

In one embodiment, the client module 122 detects that the users are not facing the remote capture system (e.g., because they are looking at a screen of the client device 102_1), and prompts the user to look at the remote image capture system 150_1, such that the resulting media is of high value (photos of people looking down at their phones are not considered valuable).

In one embodiment, the client module 122 uses sound commands such as voice guidance, to inform the end users when the image is about to be captured, so that the users do not need to look at the screen instructions (such as visual countdown markers) to become aware of the upcoming capture moment. This technique further helps capture a scene with users looking at remote image capture system 150_1, as opposed to at the screen.

Figure 5:
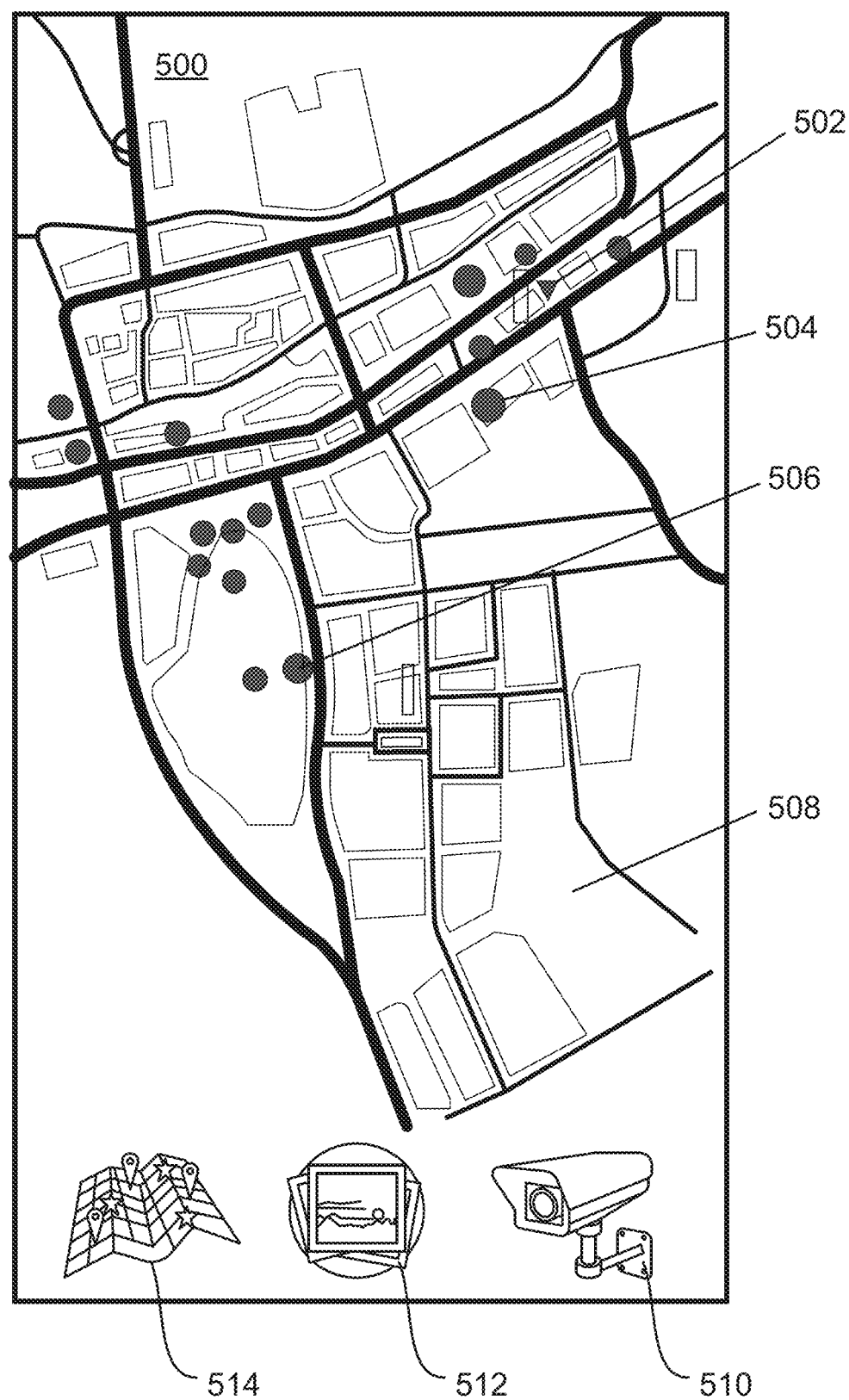
FIG. 5 illustrates a map view interface associated with an embodiment of the invention.

FIG. 5 illustrates a graphical user interface 500 supplied by the client module 122. The current location of the end user on the map is indicated at 502. Icon 504 is a landmark serviced by a remote image capture system. Clicking the icon results in the display of sample images expected at this location, as well as information about the capture site, such as the description of the site, noteworthy details, etc. Icon 506 is for another type of landmark serviced by a different remote image capture system. Region 508 is a navigable map of the geographical area or a venue. Icon 510 is activated to open the live streaming from a remote image capture system 150 when a user is in the immediate capture area. The icon 501 can be grayed out if a user is not in an immediate capture area. Icon 512 is used to open a user's gallery of photos and videos taken using remote capture systems. Icon 514 is used to open a map view of the geographical area, or the venue with indicators for remote capture sites and landmarks.

Figure 6:
FIG. 6 illustrates a camera roll interface associated with an embodiment of the invention.

FIG. 6 illustrates an interface 600 supplied by client module 122 with a gallery 602 of images and videos taken with the remote image capture system. In one embodiment, the client module 122 is configured to allow a user to find, sort or group the gallery of still and motion images by the name or location of the capture site at which the images were captured.

Figure 7:
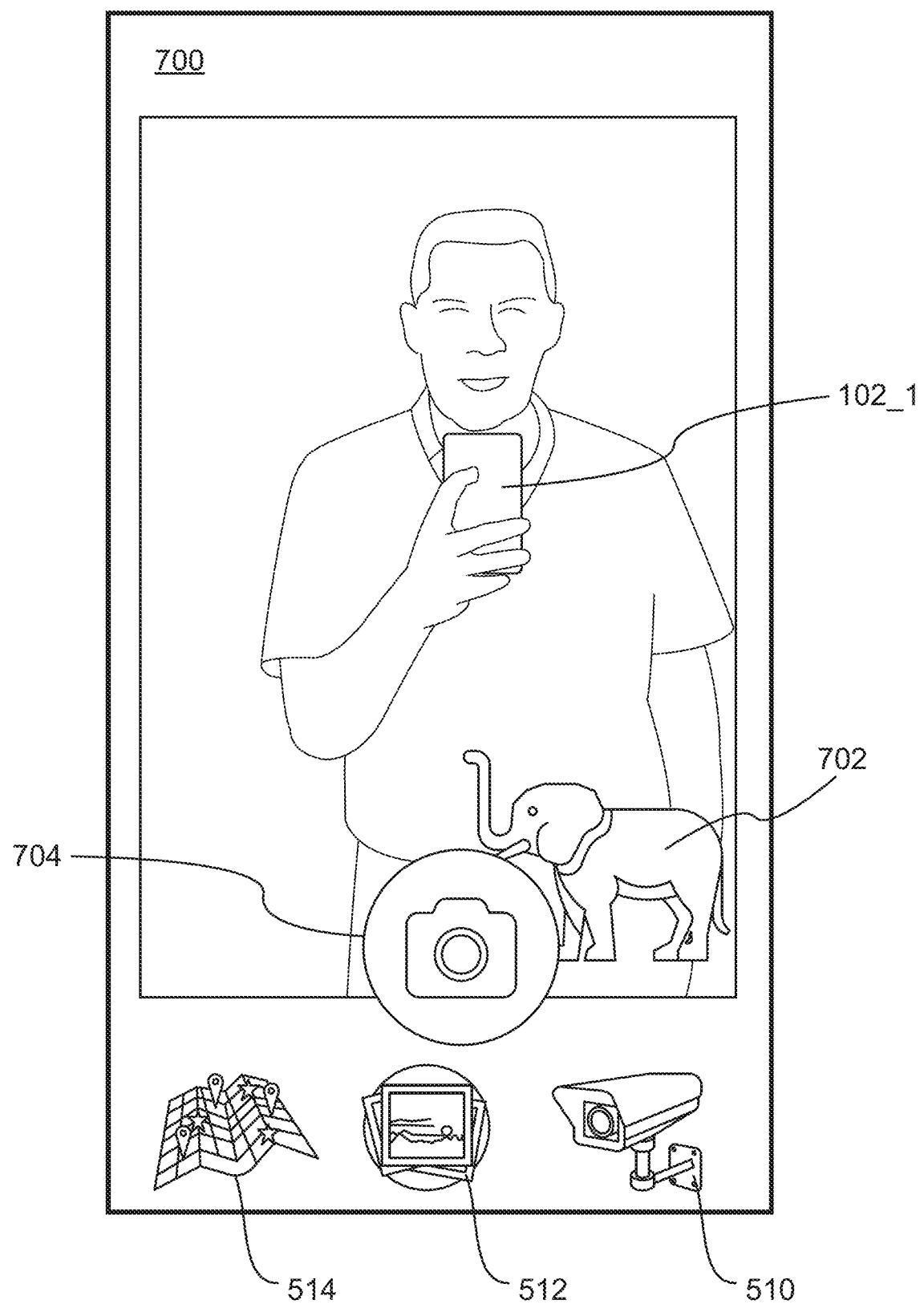
FIG. 7 illustrates an augmented reality interface associated with an embodiment of the invention.

FIG. 7 illustrates an interface 700 supplied by client module 122 in a live stream mode. The client device 102_1 is in a user's hand. The live stream mode includes an augmented reality element 702. Icon 704 initiates image or video capture by the remote image capture system.

The client module 122 and/or SaaS module 142 may be configured to automatically select and apply creative filters. Post-processing of the media captured by the remote capture system 150_1 may be based on geographical location of the capture system and/or the location of the end user in the scene.

Filters may be also be selected based on the time of day or a calendar day.

Information from sensors on the client device 102_1 may also be used to select filters. Combinations of all these factors may also be used to select filters.

Creative filters can be selected based on age, gender, physical properties such as height, clothing items, brands displayed on personal items, and other information that can be extracted automatically by observing the end users on the scene. For instance, for a family of three, a father a mother and a child, posing in front of a lion's cage at a zoo, such automatic filter selection can determine to apply artistic style of a male lion to the father, a lioness to the mother and a lion cub to the child, thus producing a unique and desirable media specific to the end user's family and the capture location.

This invention is an extension to a widely popular "selfie camera" concept, whereas the capture device is not restricted to user's mobile device, but can be placed in an arbitrary location in a natural environment, thus providing a different angle of view at the scene where the user is located. The disclosed technology is an extension of a user's mobile device that provides the end user with a familiar selfie-capturing experience, while enhancing the capabilities of hand-held mobile devices such as mobile phones.

The disclosed technology allows a client device 102_1 to evaluate attributes of a remote image capture system, thus solving one of the deficiencies of existing remote capture systems. The coupling between the client device 102_1 and the remote image capture system 150_1 can be securely paired, such that the media produced by the capture system 150_1 and transferred to the mobile device 102_1 is securely channeled to an authorized device only, based on evidence that confirms the physical location. This security is augmented by the client module 122 supplying identifying information and via facial recognition of the user.

The client module 122 is configured to:
  notify the end user when the user's mobile device 1021 (and, by extension the user device's owner) is in the proximity of a remote capture system 150_1 by means of producing sound, vibration or other signals that proactively advertise the capture opportunity. The end user may then choose to move closer into the immediate capture area or ignore this signal.
  Notify the end user when she is in the capture area, where the remote capture system is able to produce digital media such as images and video clips that include the end user.
  Show the user a video feed from the remote capture camera, thus giving the user an opportunity to see the real time preview of the scene, of which the user is a part, from the vantage point of the remote capture system.
Providing the end user with a navigable map of the geographical area where remote capture sites are clearly marked.
  Provide the end user with additional meta-information on individual remote capture sites, such as sample still or motion images users can expect to be captured at the capture site.
  Describe the capture site with information such as the name of the location, notable elements of the environment, i.e. "African Lion's Cage" or "Panoramic view of the Golden Gate Bridge", popularity of the capture site, other user's ratings of the capture site (e.g., number of "likes" collected on the media captured at this site), wait times, if applicable, capabilities of the capture system, such as "Super Zoom", "Video", "High Definition Image", "Sound", "Panorama", and the like.

Give user access to operate the remote capture system for tasks such as initiating media capture, positioning and centering of the remote capture system, accessing captured media, sharing captured media, e.g. on social networks, downloading captured media to the mobile device, modifying the captured media, such as applying creative filters, watermarks, etc.

Give the user the ability to view, download, share, delete, hide, print, or otherwise manipulate images taken through all remote capture sites.

Give the user the ability to group or limit showing the gallery of images per individual capture site.

The SaaS module 142 maintains a database of capture systems, user accounts, creative effects to be used by each capture system, etc. The SaaS module 142 is also connected to the module 122 running on client device 102_1, providing the necessary interface between the mobile application and a remote capture system 150_1. The main functions of the SaaS module 142 are:

support seamless interface between the remote capture systems 150_1 through 150_N and the client module 122 on client devices 102_1 through 102_N.

store digital media generated by the remote capture systems 150_1 through 150_N.

give authorized users access to digital media generated by the remote capture systems 150_1 through 150_N.

allow administrative tasks to be performed on the mobile device as well as on the remote capture hardware, such as software upgrades, configuration, monitoring, etc.

host additional services that aid the functions of the remote capture systems 150_1 through 150_N, such as end user face recognition, creative image processing, background removal, image augmentation with AR features, and the like.

store a database of individual remote capture systems 150_1 through 150_N, such as their descriptions, sample media, etc.

An embodiment of the invention provides a user with an option to produce a virtual photograph of himself/herself, by superimposing a photo, such as a selfie, taken with his/her client device 102_1 with a photo taken by the remote image capture rig 150_1, including when the user is not physically located on the capture site. The camera on the client device 102_1 may be simultaneously active with the camera on the remote image capture rig 150_1.

For instance, at the very same moment that the user captures a selfie photo, the remote image capture system 150_1 captures a view of the remote scene, which, after being applied to the selfie image, creates a perception of "having been there at this moment".

The SaaS module 142 may be configured to capture a scene at a remote image capture system 150_1 and temporarily store still or motion images of the scene irrespective of the end user action. Upon an actual "shoot" action by the end user, the SaaS module 142 may construct several images generated in the temporal vicinity, of the "shoot" action such that some of that media pre-dates the user action, some is synchronized with user action and some is after user action, thus giving the end user a choice of images captured at different times.

An embodiment of the present invention relates to a computer storage product with a computer readable storage medium having computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs, DVDs and holographic devices; magneto-optical media; and hardware devices that are specially configured to store and execute program code, such as application-specific integrated circuits ("ASICs"), programmable logic devices ("PLDs") and ROM and RAM devices. Examples of computer code include machine code, such as produced by a compiler, and files containing higher-level code that are executed by a computer using an interpreter. For example, an embodiment of the invention may be implemented using JAVA®, C++, or other object-oriented programming language and development tools. Another embodiment of the invention may be implemented in hard-wired circuitry in place of, or in combination with, machine-executable software instructions.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

The invention claimed is:

1. A method, comprising:
operating a remote image capture system within a defined geolocation region, the remote image capture system including a camera, position orientation controls for the camera, ambient sensors and a control unit;
designating a user of a client device that enters the geolocation region, where the user of the client device is designated based upon identifying information received from the client device;
communicating to the client device attributes of the geolocation region, wherein attributes of the geolocation region are selected from the name of the geolocation region, notable elements of the geolocation region and popularity of the geolocation region;
communicating to the client device an image capture location within the geolocation region; and
providing a prompt to the client device to activate the camera.

2. The method of claim 1 further comprising prompting the user to activate the position orientation controls for the camera.

3. The method of claim 1 further comprising altering camera settings in response to data from the ambient sensors.

4. The method of claim 1 wherein attributes of the geolocation region include attributes of the remote image capture system selected from camera zoom capability, available video resolution, and sound options.

5. The method of claim 1 further comprising operating a server as an interface between the remote image capture system and the client device.

6. The method of claim 5 further comprising storing digital media generated by the remote image capture system at the server.

7. The method of claim 5 further comprising processing user facial recognition data at the server.

8. The method of claim 5 further comprising augmenting content to digital media generated by the remote image capture system.

9. The method of claim 8 wherein the augmented content includes augmented reality content.

10. The method of claim 1 further comprising displaying on the client device a video feed from the remote capture system.

11. The method of claim 1 further comprising sharing captured digital media over a network.

12. The method of claim 1 further comprising maintaining a camera roll of digital media generated by the remote image capture system.

13. A method, comprising:
operating a remote image capture system within a defined geolocation region, the remote image capture system including a camera, position orientation controls for the camera, ambient sensors and a control unit;
designating a user of a client device that enters the geolocation region, where the user of the client device is designated based upon identifying information received from the client device;
communicating to the client device attributes of the geolocation region;
communicating to the client device an image capture location within the geolocation region;
providing a prompt to the client device to activate the camera;
operating a server as an interface between the remote image capture system and the client device; and
augmenting content to digital media generated by the remote image capture system wherein the augmented content includes augmented reality content.

14. The method of claim 13 wherein attributes of the geolocation region are selected from the name of the geolocation region, notable elements of the geolocation region and popularity of the geolocation region.

15. The method of claim 13 wherein attributes of the geolocation region include attributes of the remote image capture system selected from camera zoom capability, available video resolution, and sound options.

16. The method of claim 13 further comprising displaying on the client device a video feed from the remote capture system.

17. The method of claim 13 further comprising sharing captured digital media over a network.

18. The method of claim 13 further comprising maintaining a camera roll of digital media generated by the remote image capture system.

19. The method of claim 13 further comprising altering camera settings in response to data from the ambient sensors.

* * * * *